United States Patent
Ouyang et al.

(10) Patent No.: US 10,436,909 B2
(45) Date of Patent: Oct. 8, 2019

(54) COMPRESSIVE LINE SENSING IMAGING USING INDIVIDUALLY ADDRESSABLE LASER DIODE ARRAY

(71) Applicants: The Government of the United States of America, as represented by the Secretary of the Navy, Arlington, VA (US); Cuiling Gong, Dallas, TX (US)

(72) Inventors: Bing Ouyang, Vero Beach, FL (US); Weilin Hou, Slidell, LA (US); Fraser Dalgleish, Vero Beach, FL (US); Cuiling Gong, Dallas, TX (US); Frank Caimi, Vero Beach, FL (US); Anni Dalgleish, Vero Beach, FL (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 470 days.

(21) Appl. No.: 15/339,099

(22) Filed: Oct. 31, 2016

(65) Prior Publication Data
US 2017/0299722 A1    Oct. 19, 2017

Related U.S. Application Data

(60) Provisional application No. 62/248,704, filed on Oct. 30, 2015.

(51) Int. Cl.
*G01C 3/08* (2006.01)
*G01S 17/89* (2006.01)
(Continued)

(52) U.S. Cl.
CPC .............. *G01S 17/89* (2013.01); *G01S 7/484* (2013.01); *G01S 7/4808* (2013.01); *G01S 7/4815* (2013.01)

(58) Field of Classification Search
CPC ...... G01S 7/4808; G01S 7/4815; G01S 7/484; G01S 17/89
(Continued)

(56) References Cited

U.S. PATENT DOCUMENTS 5,402,436 A * 3/1995 Paoli .......................... B41J 2/45
                                                                347/238
5,745,153 A    4/1998 Kessler et al.
(Continued)

OTHER PUBLICATIONS

O. P. Kowalski, The Development of Laser Diode Arrays for Printing Applications, Semiconductor Laser Diode Technology and Applications, pp. 263-286, 2012.
(Continued)

*Primary Examiner* — Mark Hellner
(74) *Attorney, Agent, or Firm* — US Naval Research Laboratory; William P. Ladd

(57) ABSTRACT

Embodiments relate to compressive line sensing imaging. Initially, a codebook is configured with a pattern sequence for a series of illumination patterns. Each light element in an individually addressable laser diode array (IALDA) is independently controlled to project the series of illumination patterns onto a target. Next, measurements of the target are acquired based on the series of illumination patterns. The codebook is then used to decode the measurements to create an image of the target.

12 Claims, 7 Drawing Sheets

(51) Int. Cl.
   *G01S 7/481*      (2006.01)
   *G01S 7/48*       (2006.01)
   *G01S 7/484*      (2006.01)

(58) Field of Classification Search
   USPC ....................................................... 356/4.01
   See application file for complete search history.

(56) References Cited

U.S. PATENT DOCUMENTS 9,638,801 B2 *    5/2017  Boufounos ............. G01S 17/89
   2017/0026633 A1 * 1/2017  Riza ..................... H04N 5/2254

OTHER PUBLICATIONS

Steve Gorton and Scott Howarth, Laser Diode Arrays Revolutionize Fruit Labelling, Industrial Laser Solution, 2010.

* cited by examiner

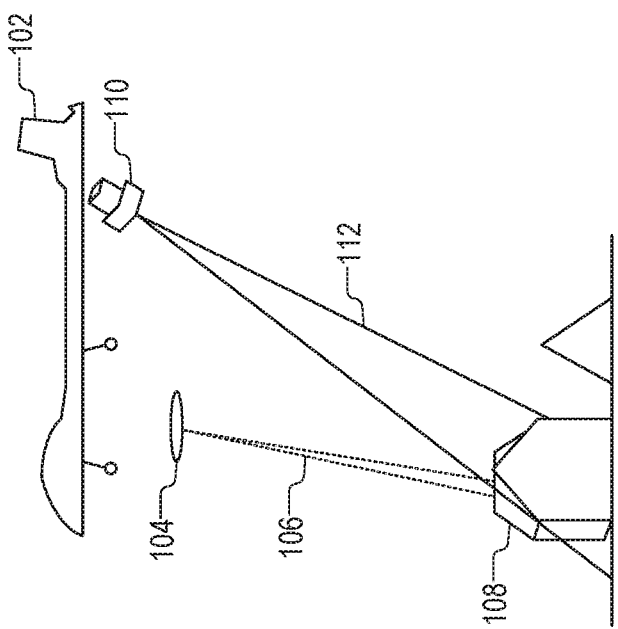
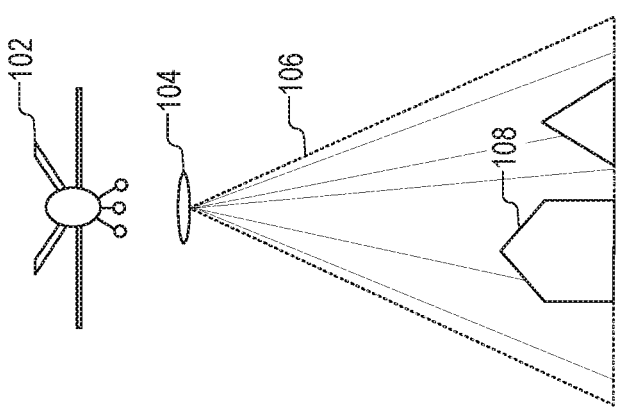
FIG. 1B
FIG. 1A
(PRIOR ART)

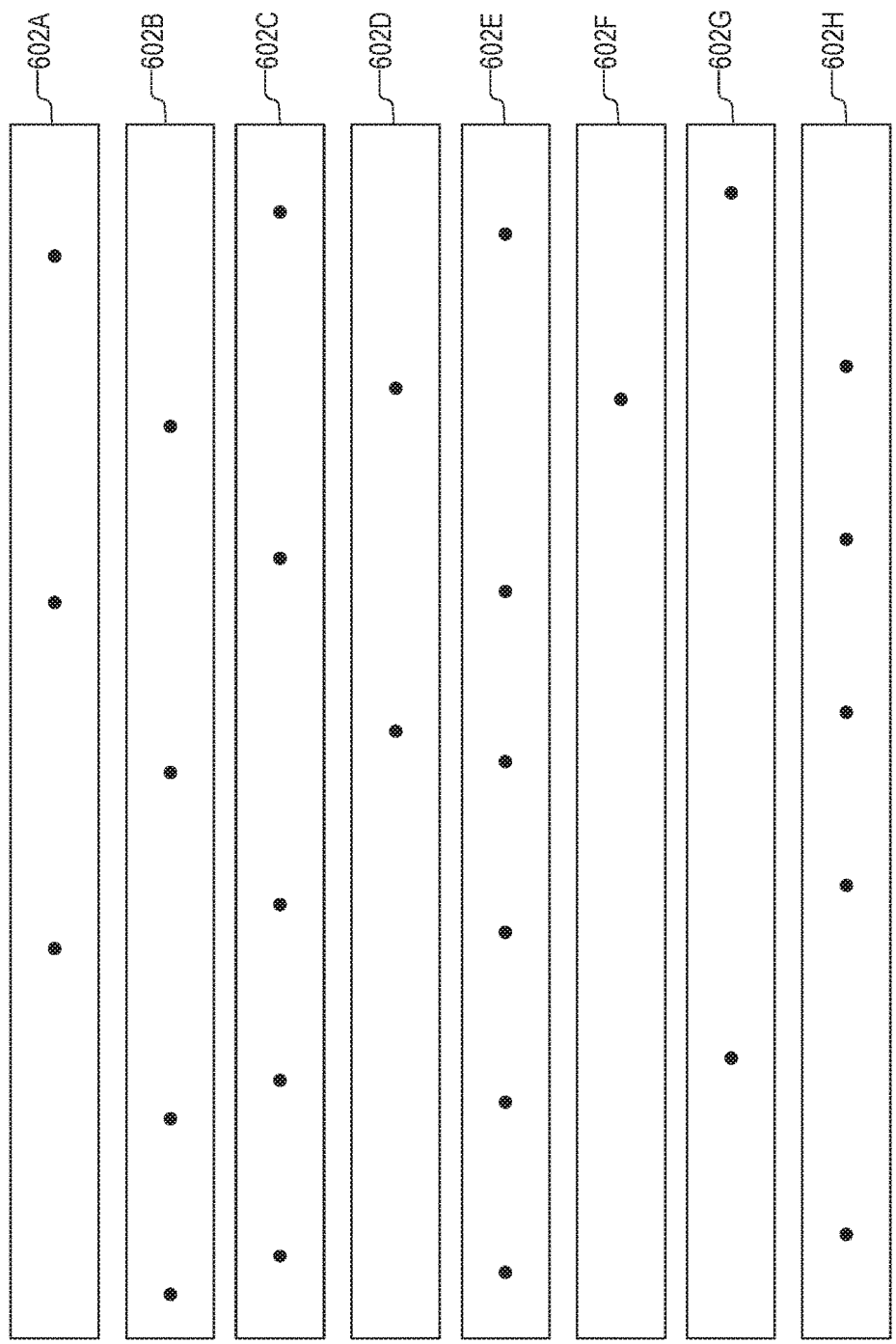

COMPRESSIVE LINE SENSING IMAGING USING INDIVIDUALLY ADDRESSABLE LASER DIODE ARRAY

CROSS-REFERENCE TO RELATED APPLICATIONS

This Application is a non-provisional application claiming priority to provisional application 62/248,704 filed on Oct. 30, 2015, under 35 USC 119(e). The entire disclosure of the provisional application is incorporated herein by reference.

BACKGROUND

Traditional laser line-scan (LLS) serial image systems as shown in FIGS. 1A and 1B can be used for non-adaptive serial raster-scan image formation. On unmanned aerial vehicles (UAVs) 102 and unmanned aerial vehicles (UUVs) (not shown), the LLS sensor 110 may consume significant power acquiring redundant data 112 of the target 108 that is discarded during the image compression phase. Increased platform speeds can require lasers 104 that are capable of emitting beams 106 with higher repetition rates to maintain the same image resolution.

SUMMARY

Embodiments relate to compressive line sensing imaging. Initially, a codebook is configured with a pattern sequence for a series of illumination patterns. Each light element in an individually addressable laser diode array (IALDA) is independently controlled to project the series of illumination patterns onto a target. Next, measurements of the target are acquired based on the series of illumination patterns. The codebook is then used to decode the measurements to create an image of the target.

BRIEF DESCRIPTION OF THE DRAWINGS

FIGS. 1A and 1B (PRIOR ART) are graphical representations of a traditional LLS serial image system;

FIG. 6 is a graphical representation of example illumination patterns as emitted by the IALDA.

DESCRIPTION

Embodiments of the invention use CLS to achieve faster signal formation, more flexible system configuration, and higher energy efficiency. The embodiments also enable compact and robust system design. An example CLS imaging system includes an IALDA, which is an active spatial light modulator. IALDA (1) allows for the phase, amplitude, and frequency of each pixel of a projected image to be controlled independently and (2) has a rapid update rate of up to 10 megahertz.

Compressive sensing (CS) is a framework for the simultaneous sampling and compression of sparse signals using incomplete linear measurements. A K-sparse signal $X \in R^{N \times 1}$ (i.e., the projection of X on a sparsifying basis $\Psi \in R^{N \times N}$: $X = \Psi \alpha$ contains $K \ll N$ non-zero entries) can be recovered with overwhelming probability using more than $M = O(K \log N)$ incoherent linear measurements: $y = AX = a\Psi\alpha$, when the measurement matrix $A \in R^{M \times N}$ is incoherent with the sparsifying basis $\Psi$ and satisfies the Restricted Isometry Property (RIP) [5]. The vector $\alpha$ (and therefore X) can be recovered from the measurements y by solving an L1-minimization problem. The CS theory essentially exploits the intra-signal redundancy within a single source, and there has been significant interest in extending it to cope with the inter-source correlations. One such approach is distributed compressive sensing (DCS). DCS is closely related to the distributed source coding theorems, which hold that the minimum rate of encoding statistically dependent sources independently is the same as the minimum rate of encoding them jointly, when the sources are decoded jointly and their differences are Gaussian.

Figure 2:
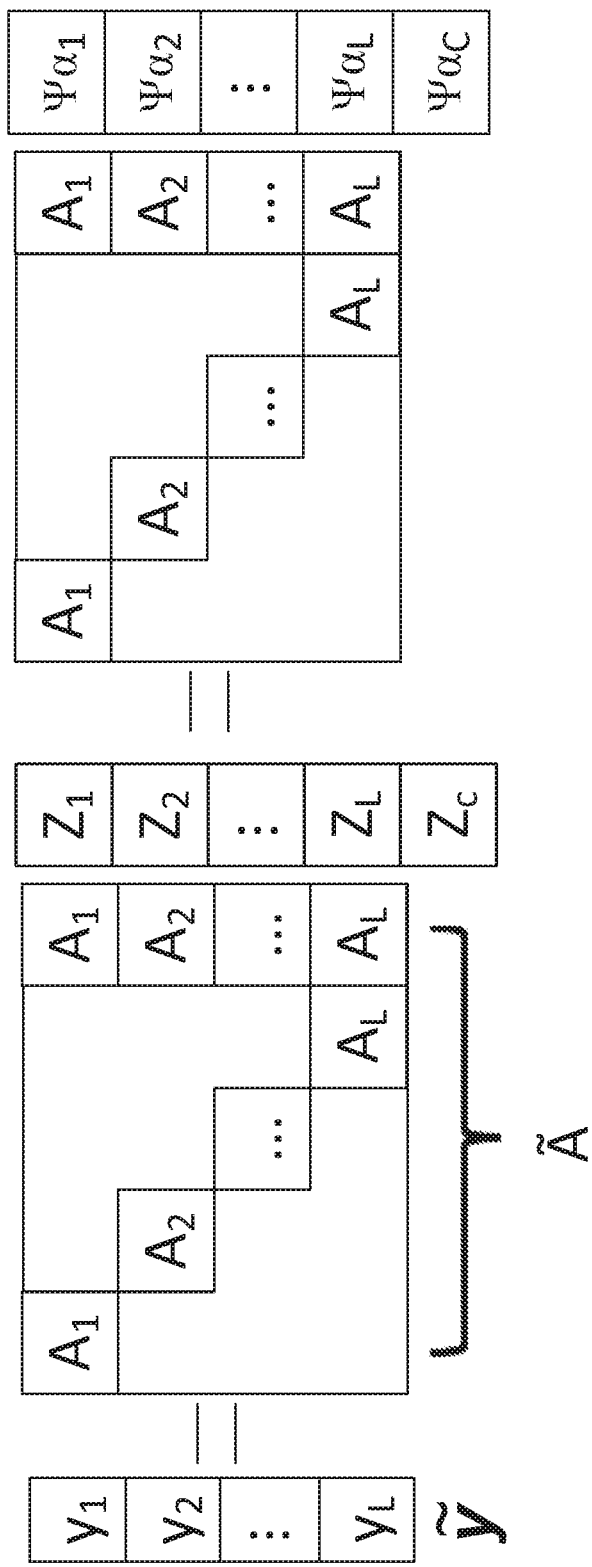
FIG. 2 is matrix form of a measurement mode for compressive line sensing (CLS)

DCS attempts to exploit the inter-signal redundancy among distributed and correlated sources through the establishment of the proper joint sparsity models (JSMs). In one example, the framework adopted in CLS, all sources $X_l$ within the group consist of a sum of a common component $Z_c$ and a component that is unique to each source $Z_l$: $X_l = Z_c + Z_l$, $l = 0, 1 \ldots L$, where L is the number of signals to be solved jointly. On a sparsifying basis $\Psi$, $Z_c$ and $Z_l$ can be expressed as $Z_c = \Psi \alpha_c$, $\|\alpha_c\|_0 = K_c$, and $Z_l = \Psi \alpha_l$, $\|\alpha_l\|_0 = K_l$ and both are sparse, i.e., $K_c \ll N$ and $K_l \ll N$. The matrix form of the measurement model is shown in FIG. 2, where $\tilde{y} = [y(1), \ldots, y(L)]^T \in R^{LM \times 1}$ are the measurements of L sources within the group; $\tilde{\alpha} = [\alpha(1), \ldots \alpha(L)]^T \in R^{LN \times 1}$ are the coefficients of the sources on the sparsifying basis $\Psi$, and $\tilde{A}$ is the measurement matrix. In this example, the solution can be cast as L1 minimization with the cost function formulated by revising the equation shown in FIG. 2 to:

$$\tilde{\alpha}^* = \arg \min \|\alpha_c\|_1 + \|\alpha_1\|_1 + \ldots + \|\alpha_L\|_1$$

$$\text{subject to } \|\tilde{y} - \tilde{A}\Psi\tilde{\alpha}\|_2 \leq \varepsilon \quad (1)$$

where $\|\alpha_l\|_1 = \Sigma_{i=1}^{N} |\alpha_l(i)|$ is the L1-norm of $\alpha_l$.

A CLS illuminator shares some similarity with a streak tube imaging Lidar, but instead of a one-dimensional (1D) fan beam, the CLS illuminator projects a series of 1D fan patterns onto the current target line. As in many CS imaging systems, this pattern can be generated through modulation of a laser source by an SLM device such as a digital micromirror device (DMD). Each pattern corresponds to one row in the CS measurement matrix (i.e., codebook). At the receiver, similar to the LLS system, a single element receiver such as the photomultiplier tube (PMT) records the total photon reflection corresponding to the modulation of the spatial pattern with the target as the measurement. Each line is measured independently; the platform motion enables the line-by-line sensing of the target scene. When the beam spreading from the illuminator to the target is taking consideration, the $m^{th}$ entry in the effective codebook will take the form: $\{\Phi_m\} = \{A_m\} * PSF_{IT}$, where $PSF_{IT}$ accounts for the beam spreading from the illuminator to the target. Therefore, a group of lines are reconstructed jointly using the DCS model:

$$\tilde{\alpha}^* = \arg \min \|\alpha_c\|_1 + \|\alpha_1\|_1 + \ldots + \|\alpha_L\|_1$$

$$\text{subject to } \|y - \Phi\Psi\alpha\|_2 \leq \varepsilon, X = \Psi\alpha \geq 0 \quad (2)$$

where L is the group of lines to be solved jointly, Ψ is the sparsifying basis, and X is the source to be recovered (i.e., target). Assuming the current line group parameter L>1, then the reconstruction of line r will be included in L solutions. These L solutions can be buffered, and the optimum reconstruction for line r can then be derived from these L solutions. For example, a median filter can be applied to obtain the final solution:

$$\alpha_r^o = \text{median}[\alpha_r^u], \text{ for } u=1 \ldots L.$$

In a CLS system, resource compression is achieved by reducing the required measurements per line while still maintain desired image quality.

Figure 3:
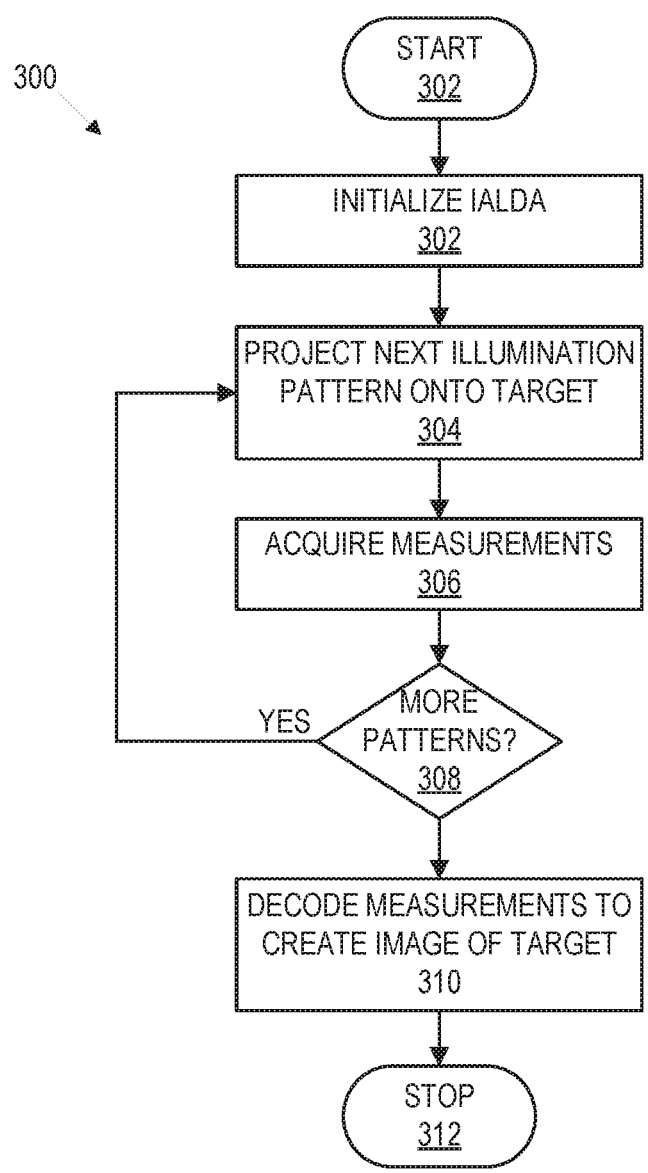
FIG. 3 is an example workflow for CLS imaging using an individually addressable laser diode array (IALDA)

FIG. 3 is an example workflow 300 for CLS imaging using an IALDA. As is the case with the other processes described herein, various embodiments may not include all of the steps described below, may include additional steps, and may sequence the steps differently. Accordingly, the specific arrangement of steps shown in FIG. 3 should not be construed as limiting the scope of gathering materials on the ocean surface based on forecasting area density.

In block 302, the workflow 300 starts and proceeds to block 304, where the IALDA is initialized. Specifically, parameters for the operation of the IALDA can be set such as pattern update frequency, single step vs. continues pattern refreshing, load pattern sequence, etc. Similarly, operating parameters such as sample rate, sample per trigger, etc. can be set for a detector.

In block 304, the IALDA is used to project the next illumination pattern onto a target. An example of a series of illumination patterns is described below with respect to FIG. 6. The illumination pattern can be generated by controlling each laser in the IALDA independently. Specifically, the amplitude and the phase of each laser can be controlled independently. The next illumination pattern can be obtained from a codebook, which specifies a series of illumination patterns.

In block 306, a detector is used to acquire measurements based on modulation of the target with an illumination pattern. The number of illumination pattern/measurements determines the compression ratio of the image that is eventually created. For example, if the target line resolution is 64 and 32 illumination patterns/measurements are obtained for each line, the compression ratio may be 2:1, and if 16 illumination patterns/measurements are obtained for each line, the compression ratio may be 4:1, and so on.

In block 308, it is determined whether there are additional illumination patterns in the codebook to project. If there are additional patterns, the workflow 300 returns to block 302 to project the next illumination pattern from the codebook onto the target. If there are no additional patterns, the workflow 300 proceeds to block 310, where all the collected measurements are decoded to create an image of the target. Workflow 300 can then stop in block 312.

Figure 4:
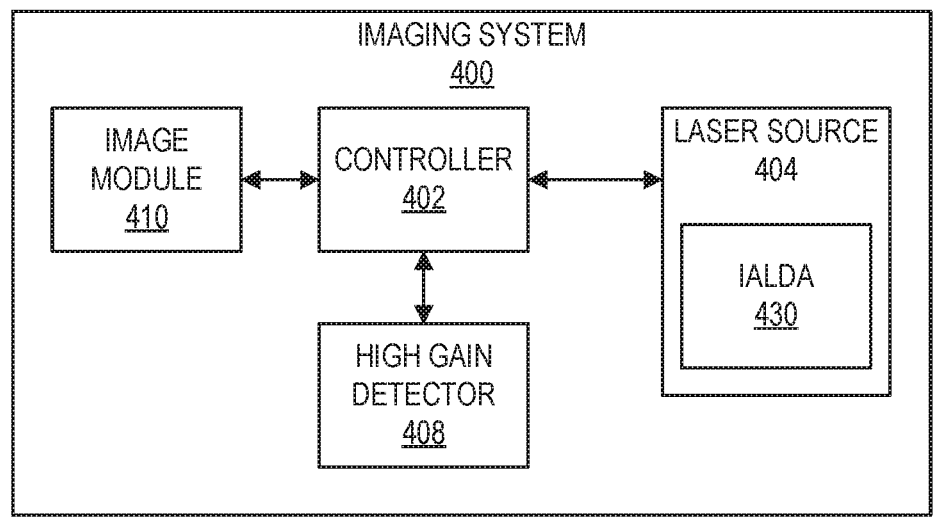
FIG. 4 is a diagram of an example CLS imaging system.

FIG. 4 is a diagram of an example CLS imaging system 400. The imaging system 400 of this example includes a controller 402, a laser source 404, a high gain detector 408, and an image module 410.

Controller 402 can be a computer processor and/or a field-programmable gate array. Controller 402 controls the operation of the laser source 404, high gain detector 408, and image module 410. For example, the controller 402 can allow a user to specify operating parameters of the laser source 404. In this example, the controller 402 can then operate the laser source 404 according to the operating parameters. The controller 402 may be connected to laser source 404 via a high-speed data interface.

Laser source 404 can include light source(s), lens(es), and an IALDA 430. Laser source 404 is used by controller 402 to project illumination patterns onto a target. The IALDA 430 has independently controllable laser diodes that allow the laser source to control each pixel of a projected image. Because each laser diode can be controlled independently, IALDA's 430 typically have higher power efficiency than DMD's and can produce patterns with higher contrast ratio. IALDA's 430 also typically have a faster pattern refresh rate than DMD's (e.g., 10 megahertz).

In some cases, the laser source 404 can also include a pair of cylindrical lenses to shape the slow axis and fast axis independently. To mitigate the issue of beam divergence along the fast axis, plano-concave cylindrical lenses can be used instead of plano-convex lenses. For example, an f1=150 mm lens may be used to collimate the beams along the fast axis and an f1=100 mm lens may be used along the slow axis. Further, a slit can be added to further shape the beam along the slow axis.

High gain detector 408 obtains measurements of a target based on the illumination patterns. For example, the high gain detector 408 may be a single element detector such as a photomultiplier tube (PMT), avalanche photodiode, etc. Similar to the laser source 404, controller 402 controls the operation of high gain detector 408. Controller 402 can buffer the measurements from the high gain detector 408 for use by the image module 410.

Image module 410 decodes measurements to generate an image of a target. For example, the measurements can be decoded according to equation (2) as described above. Image module 410 uses the series of illumination patterns in the codebook to generate the image. Image module 410 may be implemented as a Matlab script.

Image module 410 can account for medium interference when generating images. An illumination pattern is altered when it propagates from the IALDA 430 to the target. The medium's impact alters the effective codebook that should be used to decode the image. Image module 410 can modify the effective codebook according to the following:

$$y_m = C_{sys} \sum_{u,v} \left[ \alpha_{TR} \left( \frac{A_m(u) * PSF_{IT}(u, v)}{\Phi_m} \right) \circ X(u, v) + \beta \right] \quad (3)$$

Where $y_m$ are the measurements, $C_{sys}$ is a system constant, $\alpha_{TR}$ is a constant for diffuse attenuation from the target to the high gain detector 408, $A_m(u)$ is the pattern sequence, $PSF_{IT}(u, v)$ is beam spreading from the IALDA 430 to the target, $\Phi_m$ is the effective sensing pattern, $X(u, v)$ is the target, and β is ambient light, u is the cross track coordinates and v is the along track coordinates.

Figure 5B:
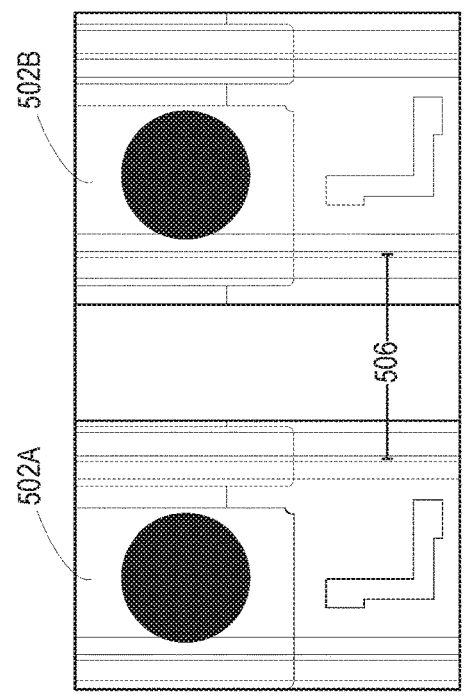
FIG. 5B is a graphical representation of individual laser diodes in the IALDA.
Figure 5A:
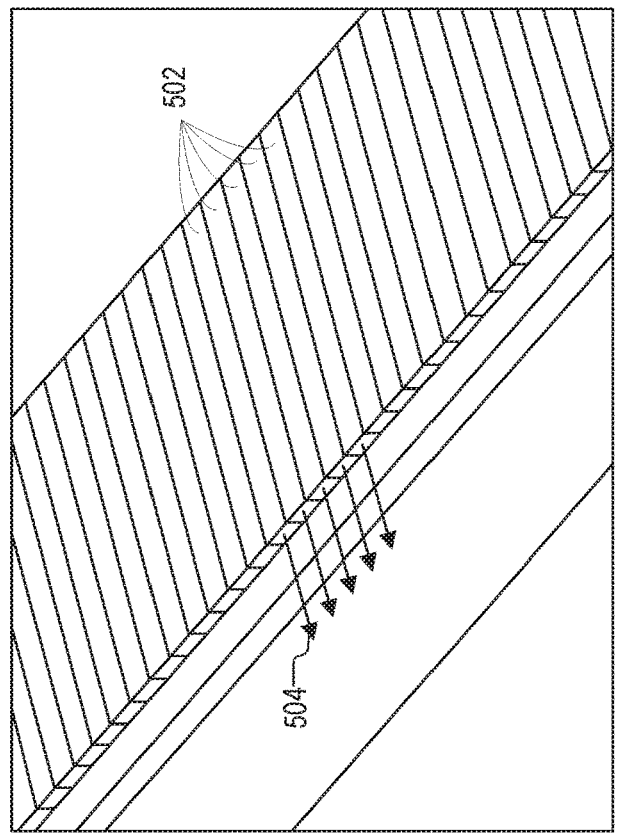
FIG. 5A is a graphical representation of an example IALDA.

FIG. 5A is a graphical representation of an example IALDA. Each laser diode 502 of the IALDA can be turned on and off independently, which can reduce power utilization and produce patterns with high contrast ratio. The independent control of laser diodes 502 allows for light patterns 504 to be projected with control of each pixel in the image. The amplitude of each diode 502 can be updated at a rate sufficient to adjust the diode power level to compensate for the variation across the detector field of view. A zoomed in view of two laser diodes 502A, 502B of IALDA is shown in FIG. 5B. The distance between two diodes 506 can be, for example, around 120 picometers.

FIG. 6 is a graphical representation of example illumination patterns 602A-602H as emitted by an IALDA. Each illumination pattern 602A-602H is an individual entry from a codebook. To mitigate the forward scattering and backscattering, multi-scale binary dither patterns can be adopted. In this example, each pattern can be divided into $N_b$ level-one blocks, where only one "on" pixel is present within each block and the on-pixel's in-block location follows a uniform distribution. The on/off polarity of each block in an illumination pattern 602A-602H may be determined by an independent Bernoulli random variable.

Figure 7:
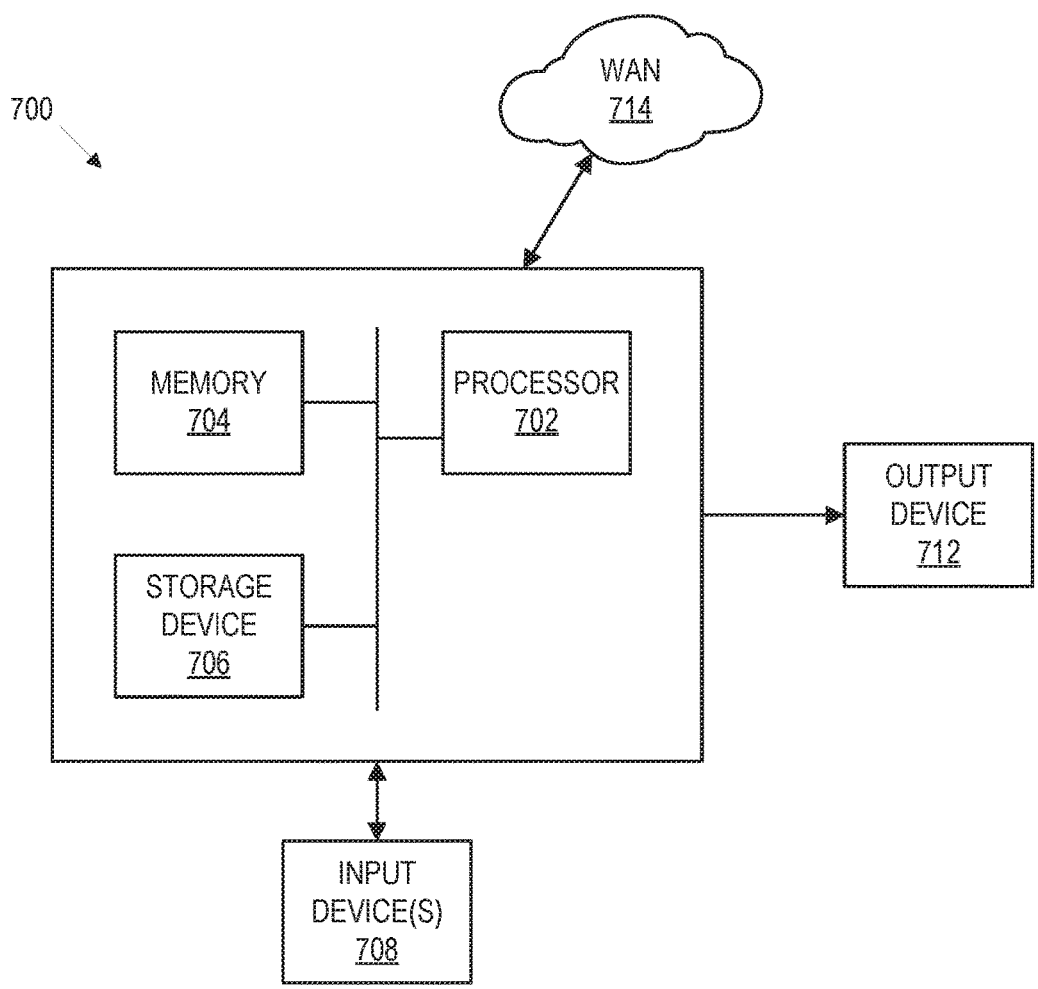
FIG. 7 is a diagram of an example computer system for executing a CLS imaging system.

The invention may be implemented on virtually any type of computer regardless of the platform being used. For example, as shown in FIG. 7, a computer system 700 includes a processor 702, associated memory 704, a storage device 706, and numerous other elements and functionalities typical of today's computers (not shown). The computer 700 may also include input means 708, such as a keyboard and a mouse, and output means 712, such as a monitor. The computer system 700 may be connected to a local area network (LAN) or a wide area network (e.g., the Internet) 714 via a network interface connection (not shown). Those skilled in the art will appreciate that these input and output means may take other forms.

Further, those skilled in the art will appreciate that one or more elements of the aforementioned computer system 700 may be located at a remote location and connected to the other elements over a network. Further, the invention may be implemented on a distributed system having a plurality of nodes, where each portion of the invention (e.g., image module, controller, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A system comprising:
    a laser source configured to generate a series of illumination patterns of a codebook from an individually addressable laser diode array (IALDA), wherein the IALDA comprises a plurality of light elements that can each be controlled independently by the controller to project the series of illumination patterns onto a target;
    a high gain detector configured to acquire the measurements of the target based on the series of illumination patterns; and
    a controller configured to:
        control the laser source and the high gain detector,
        determine an effective sensing pattern for the codebook that accounts for medium interference, and
        use the codebook and the effective sensing pattern to decode measurements to create an image of the target.

2. The system of claim 1, wherein the plurality of light elements is a plurality of laser diodes, and wherein the IALDA has a maximum refresh rate of about 10 megahertz.

3. The system of claim 2, wherein the laser source further comprises a pair of cylindrical lenses configured to independently shape a slow axis and a fast axis of beams from the plurality of laser diodes.

4. The system of claim 1, wherein the controller controls the laser source via a high-speed data interface.

5. A method for compressive line sensing imaging, the method comprising:
    configuring a codebook with a pattern sequence for a series of illumination patterns;
    independently controlling each light element of a plurality of light elements in an individually addressable laser diode array (IALDA) to project the series of illumination patterns onto a target;
    using a pair of cylindrical lenses to independently shape a slow axis and a fast axis of beams from the plurality of light elements;
    acquiring measurements of the target based on the series of illumination patterns; and
    using the codebook to decode the measurements to create an image of the target.

6. The method of claim 5, wherein using the codebook to decode the measurements further comprises:
    determining an effective sensing pattern that accounts for medium interference by applying:

$$y_m = C_{sys} \sum_{x,v} \left[ \alpha_{TR} \left( \frac{A_m(u) * PSF_{IT}(u, v)}{\Phi_m} \right) \circ X(u, v) + \beta \right]$$

wherein $y_m$ are the measurements, $C_{sys}$ a system constant, $\alpha_{TR}$ is a constant for diffuse attenuation from the target to a receiver, $A_m(u)$ is the pattern sequence, $PSF_{IT}(u, v)$ is beam spreading from the IALDA to the target, $\Phi_m$ is the effective sensing pattern, $X(u, v)$ is the target, $\beta$ is ambient light, u is cross track coordinates and v is along track coordinates; and
    using the effective sensing pattern to decode the measurements when creating the image.

7. The method of claim 5, wherein the measurements are decoded according to:

$$\tilde{\alpha}^* = \arg \min \|\alpha_c\|_1 + \|\alpha_1\|_1 + \ldots + \|\alpha_L\|_1$$

subject to $\|y - \Phi\Psi\alpha\|_2 \leq \varepsilon$, $X\Psi\alpha \geq 0$ wherein L is a group of lines to be solved jointly, $\Psi$ is a sparsifying basis, $\alpha$ are coefficients of sources on that sparsifying basis, X is the target, y is the measurements, and $\Phi$ is an effective codebook that comprises the effective sensing pattern.

8. The method of claim 5, wherein the plurality of light elements is a plurality of laser diodes, and wherein the IALDA has a maximum refresh rate of about 10 megahertz.

9. A non-transitory computer readable medium comprising computer code for compressive line sensing imaging, the computer code, when executed by a processor, performing steps to:
    configure a codebook with a pattern sequence for a series of illumination patterns;
    independently control each light element of a plurality of light elements in an individually addressable laser diode array (IALDA) to project the series of illumination patterns onto a target;
    use a pair of cylindrical lenses to independently shape a slow axis and a fast axis of beams from the plurality of light elements;

acquire measurements of the target based on the series of illumination patterns; and use the codebook to decode the measurements to create an image of the target.

10. The non-transitory computer readable medium of claim 9, wherein using the codebook to decode the measurements further comprises:

determining an effective sensing pattern that accounts for medium interference by applying:

$$y_m = C_{sys} \sum_{x,v} \left[ \alpha_{TR} \left( \frac{A_m(u) * \Psi_{IT}(u,v)}{\Phi_m} \right) \circ X(u,v) + \beta \right]$$

wherein $y_m$ are the measurements, $C_{sys}$ is a system constant, $\alpha_{TR}$ is a constant for diffuse attenuation from the target to a receiver, $A_m(u)$ is the pattern sequence, $\Psi_{IT}(u,v)$ is beam spreading from the IALDA to the target, $\Phi_m$ is the effective sensing pattern, $X(u,v)$ is the target, and $\beta$ is ambient light, u is cross track coordinates and v is along track coordinates; and using the effective sensing pattern to decode the measurements when creating the image.

11. The non-transitory computer readable medium of claim 9, wherein the measurements are decoded according to:

$$\tilde{\alpha}^* = \arg\min \|\alpha_c\|_1 + \|\alpha_1\|_1 + \ldots + \|\alpha_L\|_1$$

subject to $\|y - \Phi\Psi\alpha\|_2 \le \varepsilon$, $X\Psi\alpha \ge 0$ wherein L is a group of lines to be solved jointly, $\Psi$ is a sparsifying basis, $\alpha$ are coefficients of sources on that sparsifying basis, X is the target, Y is the measurements, and $\Phi$ is an effective codebook that comprises the effective sensing pattern.

12. The non-transitory computer readable medium of claim 9, wherein the plurality of light elements is a plurality of laser diodes, and wherein the IALDA has a maximum refresh rate of about 10 megahertz.

\* \* \* \* \*